United States Patent [19]
Diener et al.

[11] Patent Number: 5,239,964
[45] Date of Patent: Aug. 31, 1993

[54] CONCENTRIC FUEL LINE SYSTEM

[75] Inventors: Albert N. Diener, Melrose Park; Eric G. Parker, Elgin, both of Ill.

[73] Assignee: Illinois Tool Works Inc., Glenview, Ill.

[21] Appl. No.: 881,186

[22] Filed: May 11, 1992

[51] Int. Cl.[5] .................................. F02M 41/00
[52] U.S. Cl. ................................. 123/456; 123/469; 285/404
[58] Field of Search ............... 123/456, 470, 469, 468; 285/404, 305

[56] References Cited

U.S. PATENT DOCUMENTS

| | | | |
|---|---|---|---|
| 4,271,909 | 6/1981 | Chatfield | 285/404 |
| 4,289,339 | 9/1981 | Hansen | 285/404 |
| 4,401,324 | 8/1983 | Rumble | 285/404 |
| 4,510,909 | 4/1985 | Elphick | 123/469 |
| 4,519,638 | 5/1985 | Yodoshi | 285/404 |
| 4,732,131 | 3/1988 | Hensel | 123/456 |
| 4,805,575 | 2/1989 | DeConcini | 123/456 |
| 4,955,409 | 9/1990 | Tokuda | 123/456 |
| 5,076,242 | 12/1991 | Parker | 123/516 |
| 5,131,697 | 7/1992 | Shumway | 285/404 |

*Primary Examiner*—Carl S. Miller
*Attorney, Agent, or Firm*—Schwartz & Weinrieb

[57] ABSTRACT

A connector structure is provided for securely connecting a concentric fuel line having a plurality of tubes to a manifold having corresponding fluid passages in communication with the plurality of tubes. The manifold includes coupling unions having axial bores for receiving one end of each of the plurality of tubes. The connector structure includes mounting holes extending transversely to the axial bores. Each of the mounting holes receives a screw so that the outer edge of the screw is tangentially aligned with a corresponding circumferential portion of the outer wall of each one of the plurality of tubes to mechanically and positively secure the ends thereof in the respective bores.

18 Claims, 2 Drawing Sheets

CONCENTRIC FUEL LINE SYSTEM

FIELD OF THE INVENTION

This invention relates generally to fuel distribution systems for motor vehicles and more particularly, it relates to an improved connector structure in a concentric fuel line system for securely connecting a concentric fuel line having a plurality of tubes to a manifold having corresponding fluid passages in communication with the plurality of tubes.

BACKGROUND OF THE INVENTION

This invention is particularly applicable, for example, to an integral fuel line comprised of three concentrically mounted tubes in which the high pressure line is made to be the innermost tube, the low pressure or return line defining an intermediate tube is spaced from and surrounds the innermost tube, and the vapor recovery line defining an outer tube is spaced from and surrounds the intermediate tube. In a fuel distribution system of the fuel injection type for a motor vehicle, the high pressure line is used to deliver gasoline from a fuel storage tank at the rear of the motor vehicle to multi-port injectors at the front of the motor vehicle for subsequent distribution to various cylinders of the vehicle's engine. The return line is located adjacent the ejectors for returning excess or unused portion of the gasoline back to the fuel tank. The vapor recovery line is used to collect vaporized and evaporated gasoline from the "canister" area and other points adjacent the vehicle's engine and to return the same back to the fuel storage tank. Further, a manifold or coupling member (that is, a terminal block) is typically connected to each end of the integral fuel line.

Such a prior art integral fuel line with associated terminal blocks connected to its ends is described and illustrated in U.S. Pat. No. 5,076,242, which is assigned to the same assignee as the present invention. The '242 patent is hereby incorporated by reference. As shown in FIG. 3 of the '242 patent, the terminal block 22 is provided with a high pressure coupling union 44 surrounding a passage 43, a low pressure coupling union 50 surrounding a passage 48, and a vapor recovery coupling union 56 surrounding a passage 54. The respective innermost tube 30, intermediate tube 34 and outer tube 38 of the integral fuel line are joined to the corresponding coupling unions 44, 48, and 56 of the terminal block 22 by an adhesive such as glue. It has been found that the use of an adhesive is sometimes less than satisfactory as the means for securing the tubes to the coupling unions in the terminal block. Generally, the adhesives used are not chemically resistant to the gasoline and will eventually become dissolved. As a result, the union of the tubes and the coupling unions in the terminal blocks will be destroyed and a costly repair and/or replacement of the fuel line is required.

It would therefore be desirable to provide an improved connector structure for securely connecting a concentric fuel line having a plurality of tubes to a manifold having corresponding fluid passages in communication with the plurality of tubes. Further, it would be expedient that the connector structure provides for mechanically and positively connecting each of the plurality of tubes and the corresponding fluid passages within the manifold after the fuel line is attached to the manifold.

OBJECTS OF THE INVENTION

Accordingly, it is a general object of the present invention to provide an improved connector structure for use in a fuel injection type of fuel distribution system for motor vehicles which is relatively simple and economical to manufacture and assemble.

It is an object of the present invention to provide an improved connector structure for securely connecting a concentric fuel line having a plurality of tubes to a manifold having corresponding fluid passages in communication with the plurality of tubes.

It is another object of the present invention to provide an improved connector structure for mechanically and positively connecting a plurality of tubes in an integral fuel line to corresponding fluid passages within a manifold after the fuel line is attached to the manifold.

It is still another object of the present invention to provide an improved connector structure which is formed of a terminal block having a bore for receiving one end of a tube and a passageway in fluid communication with the duct of the tube, and a mounting hole extending transversely to the bore and receiving a screw so that the outer edge of the screw is tangentially aligned with a circumference of the outer wall of the tube to mechanically and positively secure the end of the tube in the bore.

SUMMARY OF THE INVENTION

In accordance with these aims and objectives, the present invention is concerned with the provision of an improved connector structure for use in a fuel injection type of fuel distribution system for motor vehicles which includes an integral fuel line and a manifold. The fuel line is formed of an innermost tube having a first duct, an intermediate tube being spaced from and surrounding the innermost tube to form a second duct therebetween, and an outer tube being spaced from and surrounding the intermediate tube to form a third duct therebetween. The manifold includes a first coupling union, a second coupling union disposed upstream of the first coupling union, and a third coupling union disposed upstream of the second coupling union.

The first coupling union includes a first axial bore for receiving one end of the innermost tube and a first passageway in fluid communication with the first duct. The second coupling union includes a second axial bore for receiving one end of the intermediate tube and a second passageway in fluid communication with the second duct. The third coupling union includes a third axial bore for receiving one end of the outer tube and a third passageway in fluid communication with the third duct.

The first coupling union has a first mounting hole extending transversely to the first axial bore. The first mounting hole receives a first screw so that the outer edge of the first screw is tangentially aligned with a circumference of the outer wall of the innermost tube to mechanically and positively secure the one end thereof in the first axial bore. The second coupling union has a second mounting hole extending transversely to the second axial bore. The second mounting hole receives a second screw so that the outer edge of the second screw is tangentially aligned with a circumference of the outer wall of the intermediate tube to mechanically and positively secure the one end thereof in the second axial bore. The third coupling union has a third mounting hole extending transversely to the third axial bore. The third mounting hole receives a third screw so that the outer edge of the third screw is tangentially aligned with a circumference of the outer wall of the outer tube to mechanically and positively secure the one end thereof in the third axial bore.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 3 is a longitudinal section view, taken along the lines 3—3 of FIG. 1;

FIG. 4 is an end view of the connector structure of FIG. 1;

FIG. 5 is a cross-sectional view, taken along the lines 5—5 of FIG. 3;

FIG. 6 is a cross-sectional view, taken long the lines 6—6 of FIG. 3, and

FIG. 7 is a cross-sectional view, taken along the lines 7—7 of FIG. 3.

DESCRIPTION OF THE PREFERRED EMBODIMENT

Figure 1:
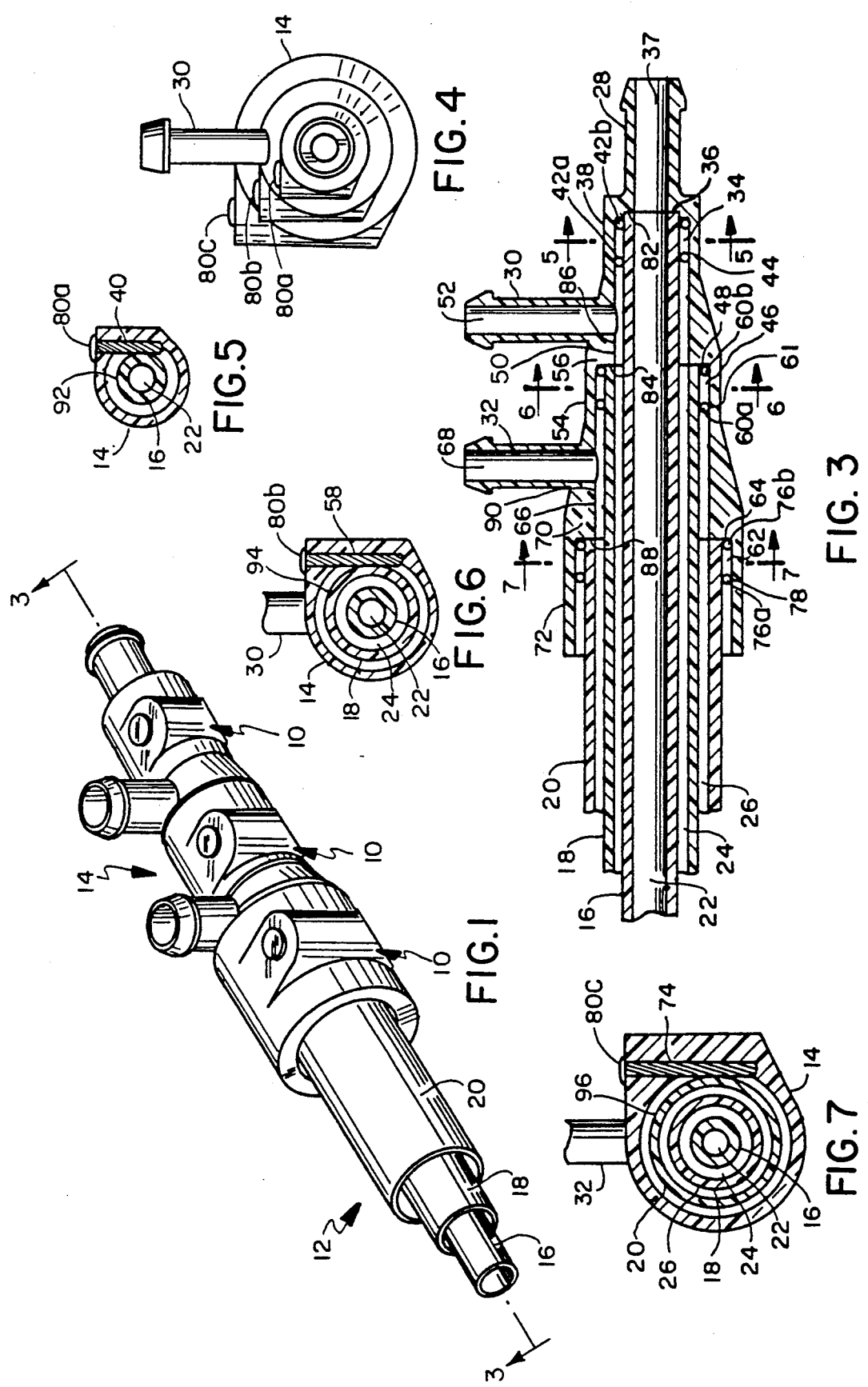
FIG. 1 is a perspective view of a connector structure of the present invention for connecting an integral fuel line to a manifold.
Figure 2:
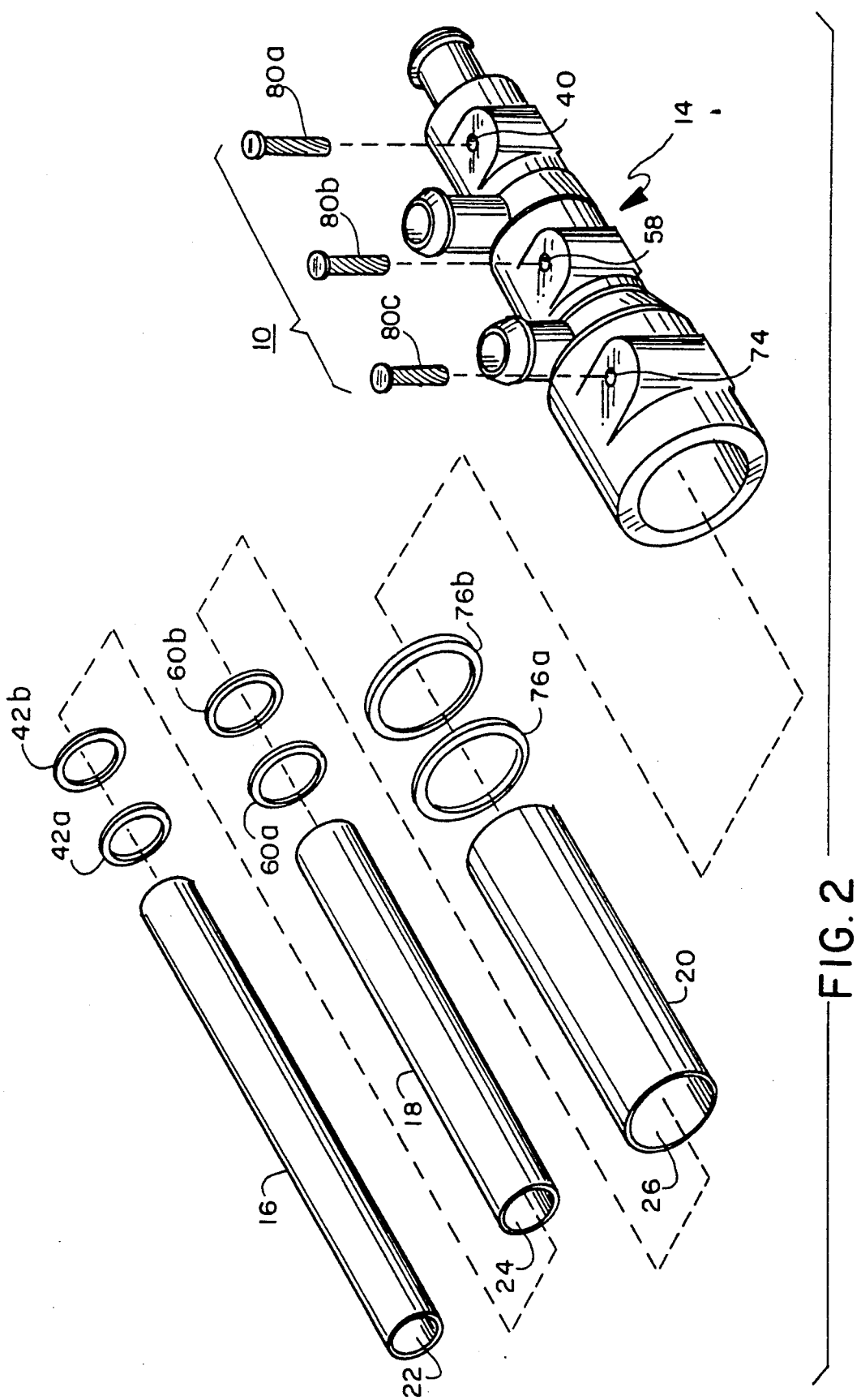
FIG. 2 is an exploded view of the connector structure of FIG. 1.

Referring now in detail to the drawings, there is shown in FIG. 1 a connector structure 10 of the present invention used in conjunction with a concentric fuel line system for securely connecting an integral fuel line 12 to a manifold or coupling member 14 (that is, a terminal block). It should be noted that a terminal block is generally connected to each end of the integral fuel line. However, since the connector structure 10 for joining the integral fuel line to its corresponding terminal block or coupling member at each end thereof is identical in its construction, it will be sufficient to show in detail and describe only one of the ends.

As best seen from FIGS. 2 through 7, the integral fuel line 12 used preferably in a fuel injection type of fuel distribution system for motor vehicles is comprised of three concentrically mounted tubes consisting of an innermost tube 16, an intermediate tube 18, and an outer tube 20. The innermost tube defines a high pressure line and has a first passage or duct 22 for delivering fuel (that is gasoline) from a storage tank to an engine cylinder of the motor vehicle. The intermediate tube 18 defines a low pressure or return line and is spaced radially from the innermost tube 16 in coaxial relationship to form a second passage or duct 24 therebetween for returning the unused portion of the fuel back to the storage tank. The outer tube 20 defines a vapor recovery line and is spaced radially from the intermediate tube 18 in coaxial relationship to form a third passage or duct 26 therebetween for returning vaporized and evaporated fuel back to the storage tank.

The manifold or coupling member 14 is preferably fabricated as a unitary structure by an insert-injection molding process. The manifold may be formed of a number of thermoplastic materials such as polyethylene, polypropylene, polyvinyl chloride and the like. The manifold includes a high pressure coupling union 28, a low pressure coupling union 30, and a vapor recovery coupling union 32. The high pressure coupling union 28 includes a first axial bore 34 of a relatively small diameter terminating in a shoulder 36 and a horizontal passageway 37 extending outwardly about the longitudinal axis of the bore 34. The first axial bore 34 is defined by a circumferential wall portion 38 whose diameter is slightly larger than the diameter of the innermost tube 16. A first mounting hole 40 is provided in the intermediate area of the wall portion 38 and extends transversely therein. On each axial side of the mounting hole 40 in the longitudinal direction, there is provided a first set of resilient sealing O-rings 42a and 42b which are located in grooves 44 formed in the wall portion 38.

The low pressure coupling union 30 includes a second axial bore 46 of a relatively intermediate diameter terminating in a shoulder 48, a third axial bore 50, and a radial outwardly extending passageway 52 whose axis is normal to the longitudinal axis of the horizontal passageway 37. The second axial bore 46 is defined by a circumferential wall portion 54 whose diameter is slightly larger than the diameter of the intermediate tube 18. The third axial bore 50 is defined by a circumferential wall portion 56 whose diameter is smaller than the diameter of the second axial bore 46 and is equal in size to the first bore 34. It will be noted that the radial passageway 52 is disposed between the first and third bores. A second mounting hole 58 is provided in the intermediate area of the wall portion 54 and extends transversely therein. While the axis of the second mounting hole 58 is shown to be spaced apart from and parallel to the axis of the first mounting hole 40, it may be arranged so as to be angled with respect to the axis of the first mounting hole. On each axial side of the second mounting hole 58 in the longitudinal direction, there is provided a second set of resilient sealing O-rings 60a and 60b which are located in grooves 6 formed in the wall portion 54.

The vapor recovery coupling union 32 includes a fourth axial bore 62 of a relatively large diameter terminating in a shoulder 64, a fifth axial bore 66, and a second radial outwardly extending passageway 68 whose axis is normal to the longitudinal axis of the horizontal passageway 37 but may be angled with respect to the axis of the radial passageway 52. The fourth axial bore 62 is defined by a circumferential wall portion 72 whose diameter is slightly larger than the diameter of the outer tube 20. The fifth axial bore 66 is defined by a circumferential wall portion 70 whose diameter is smaller than the diameter of the fourth axial bore 62 and is equal in size to the second axial bore 46. It will be noted that the second radial passageway 68 is disposed between the second and fifth bores. A third mounting hole 74 is provided in the intermediate area of the wall portion 72 and extends transversely therein. Again, while the axis of the third mounting hole 74 is shown to be spaced apart from and parallel to the axis of the second mounting hole 58, it may be arranged so as to be angled with respect to the axis of the second mounting hole and/or the axis of the first mounting hole. On each axial side of the third mounting hole 74 in the longitudinal direction, there is provided a third set of resilient sealing O-rings 76a and 76b which are located in grooves 78 formed in the wall portion 72.

The connector structure 10 is defined by the first, second and third mounting holes 40, 58 and 74 which receive therein respective externally threaded locking screws 80a, 80b, and 80c. In operation, the integral fuel line is inserted into the interior of the manifold 14 so that the ducts 22, 24 and 26 thereof are in fluid communication with the respective passageways 37, 52 and 68 of the manifold 14. In particular, the innermost tube 16 extends inwardly all the way in the manifold up to the high pressure coupling union 28 so that its distal end is sealingly engaged within the first axial bore 34 via the O-rings 42a and 42b. The end 82 of the innermost tube 16 is seated against the shoulder 36. The duct 22 is in fluid communication with the horizontal passageway 37.

The intermediate tube 18 extends inwardly partway in the manifold up to the low pressure coupling union 30 so that its distal end is sealingly engaged within the second axial bore 46 by the O-rings 60a and 60b. The end 84 of the intermediate tube 18 is seated against the shoulder 48. The duct 24 is in fluid communication with the first radial passageway 52 via the third axial bore 50 formed between an internal surface of wall portion 56 and the exterior surface of the innermost tube 16. The outer tube 20 extends inwardly only a short way into the interior of the manifold up to the vapor recovery coupling union 32 so that its distal end is sealingly engaged within the fourth axial bore 62 by the O-rings 76a and 76b. The end 88 of the outer tube 20 is seated against the shoulder 64. The duct 26 is in fluid communication with the second radial passageway 68 via, the fifth bore 66 formed between an internal surface of wall portion 70 and the exterior surface of the intermediate tube 18.

The locking screws 80a-80c are preferably of the self-driving type which can be manually depressed into the respective mounting holes 40, 58 and 74 without requiring the use of a tool. It will be noted that the head of each screw is formed without a slot so as to prevent removal after insertion. As the screw 80a is inserted into the first mounting hole 40, the outer edge of the screw 80a becomes tangentially aligned with a circumferential portion of the outer wall 92 of the innermost tube 16. Thus, the screw 80a serves to mechanically and positively secure the end of the tube 16 within the first axial bore 34.

Similarly, as the screw 80b is inserted into the second mounting hole 58, the outer edge of the screw 80b becomes tangentially aligned with a circumferential portion of the outer wall 94 of the intermediate tube 18. Consequently, the screw 80b serves to mechanically and positively secure the end of the tube 18 within the second axial bore 46. Further, as the screw 80c is inserted into the third mounting hole 74, the outer edge of the screw 80c becomes tangentially aligned with a circumferential portion of the outer wall 96 of the outer tube 20. Therefore, the screw 80c serves to mechanically and positively secure the tube 20 within the fourth axial bore 62.

From the foregoing detailed description, it can thus be seen that the present invention provides an improved connector structure for securely connecting a concentric fuel line having a plurality of tubes to a manifold having corresponding fluid passages in communication with the plurality of tubes. The connector structure includes mounting holes extending transversely to bores formed in a terminal block for receiving the ends of the plurality of tubes and screws disposed in the mounting holes so that the outer edges of the screws are tangentially aligned with a corresponding circumferential portion of the outer wall of each one of the plurality of tubes.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. In a fuel injection type of fuel distribution system for motor vehicles, a connector structure comprising, in combination:

an integral fuel line formed of an innermost tube having a first duct defined therein for carrying a first fuel component of said fuel distribution system, an intermediate tube being spaced from and surrounding said innermost tube so as to form a second duct therebetween for carrying a second fuel component of said fuel distribution system, and an outer tube being spaced from and surrounding said intermediate tube so as to form a third duct therebetween for carrying a third fuel component of said fuel distribution system;

manifold means having a first coupling union, a second coupling union disposed upstream of said first coupling union, and a third coupling union disposed upstream of said second coupling union;

said first coupling union including a first axial bore for receiving one end of said innermost tube, and a first passageway in fluid communication with said first duct;

said second coupling union including a second axial bore for receiving one end of said intermediate tube, and a second passageway in fluid communication with said second duct;

said third coupling union including a third axial bore for receiving one end of said outer tube, and a third passageway in fluid communication with said third duct;

said first coupling union having a first mounting hole, extending transversely to said first axial bore, for receiving a first screw so that an outer peripheral edge portion of said first screw is tangentially aligned with an outer circumferential wall portion of said innermost tube so as to mechanically and positively secure said one end thereof within said first axial bore;

said second coupling union including a second mounting hole, extending transversely to said second axial bore, for receiving a second screw so that an outer peripheral edge portion of said second screw is tangentially aligned with an outer circumferential wall portion of said intermediate tube so as to mechanically and positively secure said one end thereof within said second axial bore;

said third coupling union having a third mounting hole, extending transversely to said third axial bore, for receiving a third screw so that an outer peripheral edge portion of said third screw is tangentially aligned with an outer circumferential wall portion of said outer tube so as to mechanically and positively secure said one end thereof within said third axial bore;

a first set of resilient sealing ring means disposed within said first axial bore, upon opposite axial sides of said first mounting hole and said first screw disposed therein, and engaging axially spaced outer peripheral surface portions of said innermost tube for supporting said innermost tube in a radially spaced relationship with respect to said first axial bore and said intermediate tube and thereby defining said second duct, between said first axial bore and said innermost tube, and between said innermost tube and said intermediate tube, for carrying said second fuel component of said fuel distribution system, and for forming a fluidtight connection between said innermost tube and said first axial bore within the vicinity of said first mounting hole and said first screw disposed therein;

a second set of resilient sealing ring means disposed within said second axial bore, upon opposite axial sides of said second mounting hole and said second screw disposed therein, and engaging axially spaced outer peripheral surface portions of said intermediate tube for supporting said intermediate tube in a radially spaced relationship with respect to said second axial bore and said outer tube and thereby defining said third duct, between said second axial bore and said intermediate tube, and between said intermediate tube and said outer tube, for carrying said third fuel component of said fuel distribution system, and for forming a fluid-tight connection between said intermediate tube and said second axial bore within the vicinity of said second mounting hole and said second screw disposed therein; and a third set of resilient sealing ring means disposed within said third axial bore, upon opposite axial sides of said third mounting hole and said third screw disposed therein, and engaging axially spaced outer peripheral surface portions of said outer tube for supporting said outer tube within said third axial bore, and for forming a fluid-tight connection between said outer tube and said third axial bore within the vicinity of said third mounting hole and said third screw disposed therein.

2. In a fuel injection type of fuel distribution system as claimed in claim 1, wherein said manifold means is comprised of a terminal block which is formed by an insert-injection molding process.

3. In a fuel injection type of fuel distribution system as claimed in claim 1, wherein said first, second and third screws are formed of the self-driving type.

4. In a fuel injection type of fuel distribution system as claimed in claim 3, wherein said first, second and third screws are formed with a head having no slot so as to prevent their removal after insertion.

5. In a fuel injection type of fuel distribution system as claimed in claim 1, wherein said first passageway is comprised of a horizontal passage which extends outwardly about the longitudinal axis of said first axial bore.

6. In a fuel injection type of fuel distribution system as claimed in claim 5, wherein said second passageway is comprised of a first radial outwardly extending passageway whose axis is normal to the longitudinal axis of said first axial bore.

7. In a fuel injection type of fuel distribution system as claimed in claim 6, wherein said third passageway is comprised of a second radial outwardly extending passageway whose axis is normal to the longitudinal axis of said first axial bore and is spaced axially from said second passageway.

8. In a fuel injection type of fuel distribution system for motor vehicles, a connector structure comprising, in combination:

an integral fuel line formed of an innermost tube having a first duct defined therein for carrying a first fuel component of said fuel distribution system, an intermediate tube being spaced from and surrounding said innermost tube so as to form a second duct therebetween for carrying a second fuel component of said fuel distribution system, and an outer tube being spaced from and surrounding said intermediate tube so as to form a third duct therebetween for carrying a third fuel component of said fuel distribution system;

manifold means having a first coupling union, a second coupling union disposed upstream of said first coupling union, and a third coupling union disposed upstream of said second coupling union;

said first coupling union including a first axial bore for receiving one end of said innermost tube, and a first passageway in fluid communication with said first duct;

said second coupling union including a second axial bore for receiving one end of said intermediate tube, and a second passageway in fluid communication with said second duct;

said third coupling union including a third axial bore for receiving one end of said outer tube, and a third passageway in fluid communication with said third duct;

a mounting hole defined within one of said first, second, and third coupling unions for receiving a screw so that an outer peripheral edge portion of said screw is tangentially aligned with an outer circumferential wall portion of the corresponding one of said tubes so as to mechanically and positively secure said corresponding one of said tubes within a corresponding one of said axial bores of said one of said first, second, and third coupling unions; and a set of resilient sealing ring means disposed within said corresponding one of said axial bores, upon opposite axial sides of said mounting hole and said screw disposed therein, and engaging axially spaced outer peripheral surface portions of said corresponding one of said tubes for supporting said corresponding one of said tubes in a radially spaced relationship with respect to an adjacent one of said tubes and said corresponding one of said axial bores and thereby defining one of said ducts, between said corresponding one of said tubes and said adjacent one of said tubes, for carrying one of said fuel components of said fuel distribution system, and for forming a fluid-tight connection between said corresponding one of said tubes and said corresponding one of said axial bores within the vicinity of said mounting hole and said screw disposed therein.

9. In a fuel injection type of fuel distribution system as claimed in claim 8, wherein said manifold means is comprised of a terminal block which is formed by an insert-injection molding process.

10. In a fuel injection type of fuel distribution system as claimed in claim 8, wherein:

said screw disposed within said mounting hole defined within one of said first, second, and third coupling unions is formed of the self-driving type.

11. In a fuel injection type of fuel distribution system as claimed in claim 10, wherein:

said screw disposed within said mounting hole defined within one of said first, second, and third coupling unions is formed with a head having no slot so as to prevent its removal after insertion.

12. In a fuel injection type of fuel distribution system as claimed in claim 8, wherein said first passageway is comprised of a horizontal passage which extends outwardly about the longitudinal axis of said first axial bore.

13. In a fuel injection type of fuel distribution system as claimed in claim 12, wherein said second passageway is comprised of a first radial outwardly extending passageway whose axis is normal to the longitudinal axis of said first axial bore.

14. In a fuel injection type of fuel distribution system as claimed in claim 13, wherein said third passageway is comprised of a second radial outwardly extending passageway whose axis is normal to the longitudinal axis of said first axial bore and is spaced axially from said second passageway.

15. The fuel distribution system as set forth in claim 1, wherein:

said first fuel component comprises gasoline being conducted from a storage tank to an engine cylinder of said motor vehicle, said second component comprises unused gasoline being conducted from said engine of said motor vehicle back to said storage tank, and said third fuel component comprises vaporized and evaporated fuel being conducted from said engine of said motor vehicle back to said storage tank.

16. The fuel distribution system as set forth in claim 8, wherein:

said first fuel component comprises liquid fuel being conducted from a storage tank to an engine cylinder of said motor vehicle, said second fuel component comprises unused liquid fuel being conducted from said engine of said motor vehicle back to said storage tank, and said third fuel component comprises vaporized and evaporated fuel being conducted from said engine of said motor vehicle back to said storage tank.

17. The fuel distribution system as set forth in claim 2, wherein:

said manifold means is fabricated from a thermoplastic material selected from the group of polyethylene, polypropylene, and polyvinylchloride.

18. The fuel distribution system as set forth in claim 9, wherein:

said manifold means is fabricated from a thermoplastic material selected from the group of polyethylene, polypropylene, and polyvinylchloride.

* * * * *